(12) United States Patent
Binmore

(10) Patent No.: US 9,714,730 B2
(45) Date of Patent: Jul. 25, 2017

(54) IDENTIFICATION TAGS AND SYSTEMS SUITABLE FOR THIN-WALLED COMPONENTS

(75) Inventor: Ian Rex Binmore, Houston, TX (US)

(73) Assignee: Vallourec Oil and Gas France, Aulnoye-Aymeries (FR)

( * ) Notice: Subject to any disclaimer, the term of this patent is extended or adjusted under 35 U.S.C. 154(b) by 1059 days.

(21) Appl. No.: 13/225,228

(22) Filed: Sep. 2, 2011

(65) Prior Publication Data
US 2013/0056538 A1 Mar. 7, 2013

(51) Int. Cl.
| G06K 19/077 | (2006.01) |
| F16L 21/00 | (2006.01) |
| F16L 15/00 | (2006.01) |
| E21B 47/01 | (2012.01) |
| E21B 17/02 | (2006.01) |

(52) U.S. Cl.
CPC ............ *F16L 15/001* (2013.01); *E21B 17/02* (2013.01); *E21B 47/01* (2013.01); *G06K 19/07739* (2013.01); *F16L 2201/60* (2013.01); *Y10T 29/49826* (2015.01)

(58) Field of Classification Search
CPC ..... F16L 15/001; F16L 2201/60; F16L 21/00; F16L 55/00; F16L 21/06; E21B 17/02; E21B 47/01; E21B 17/00; E21B 17/006; E21B 17/08; E21B 17/10; G06K 19/07739; G06K 19/077; Y10T 29/49826; B23P 19/00
USPC ...... 340/572.1–572.9, 853.1–856.4; 235/492
See application file for complete search history.

(56) References Cited

U.S. PATENT DOCUMENTS

| 4,962,579 A * | 10/1990 | Moyer ................. E21B 17/042 285/334 |
| 5,202,680 A * | 4/1993 | Savage ...................... 340/853.1 |
| 5,212,885 A * | 5/1993 | Buonodono .......... B23P 19/066 29/407.02 |
| 5,731,957 A | 3/1998 | Brennan |

(Continued)

FOREIGN PATENT DOCUMENTS

| DE | 4425736 | 1/1996 |
| DE | 20012237 | 10/2000 |

(Continued)

OTHER PUBLICATIONS

Czkunyuan, API Coupling, Sep. 1, 2010, p. 1.*

(Continued)

*Primary Examiner* — Brian Wilson
(74) *Attorney, Agent, or Firm* — Oblon, McClelland, Maier & Neustadt, L.L.P.

(57) ABSTRACT

Various identification tags are disclosed. In one embodiment, a system includes a coupling with an extended skirt having an opening to receive an identification tag. The identification tag may be configured to be snapped into the opening, slid into the opening, or threaded into the opening, for example. The identification tag, such as an RFID tag, may include an electronics module to enable wireless communication with a reader. The electronics module may be received within a body to facilitate installation and retention of the tag and increase durability. The disclosed tags may also be installed in other components. Various other tags, systems, devices, and methods pertaining to identification tags are also disclosed.

20 Claims, 11 Drawing Sheets

(56) References Cited

U.S. PATENT DOCUMENTS

| | | | |
|---|---|---|---|
| 6,100,804 A | | 8/2000 | Brady et al. |
| 6,202,596 B1* | | 3/2001 | Lopez et al. ............... 119/174 |
| 7,327,266 B2* | | 2/2008 | Watanabe ........ G06K 19/07749 |
| | | | 340/572.1 |
| 2002/0014966 A1 | | 2/2002 | Strassner et al. |
| 2002/0133942 A1* | | 9/2002 | Kenison ................ G01V 15/00 |
| | | | 29/841 |
| 2002/0158120 A1 | | 10/2002 | Zierolf |
| 2004/0052034 A1 | | 3/2004 | Senba et al. |
| 2005/0189679 A1* | | 9/2005 | Kenison et al. ......... 264/272.11 |
| 2005/0230109 A1* | | 10/2005 | Kammann ............. E21B 44/00 |
| | | | 166/255.1 |
| 2005/0242583 A1* | | 11/2005 | Geary .................. E21B 17/042 |
| | | | 285/333 |
| 2007/0023185 A1* | | 2/2007 | Hall et al. .................. 166/255.1 |
| 2007/0124220 A1* | | 5/2007 | Griggs et al. ................... 705/28 |
| 2009/0115616 A1 | | 5/2009 | Binmore |
| 2010/0096455 A1* | | 4/2010 | Binmore ............. G06K 7/0008 |
| | | | 235/439 |
| 2010/0098507 A1 | | 4/2010 | Binmore |

FOREIGN PATENT DOCUMENTS

| | | |
|---|---|---|
| DE | 10227683 | 1/2004 |
| DE | 102007030829 | 1/2009 |
| DE | 10 2008 008423 A1 | 8/2009 |
| FR | 2 891 888 A1 | 4/2007 |
| WO | 2006/036863 A1 | 4/2006 |
| WO | 2012/152657 A1 | 11/2012 |

OTHER PUBLICATIONS

Qihaioil, Crossover Sub, Feb. 1, 2011, p. 1.*
U.S. Appl. No. 12/771,766, filed Apr. 30, 2010, Ian Rex Binmore.
U.S. Appl. No. 12/953,289, filed Nov. 23, 2010, Ian Rex Binmore.
U.S. Appl. No. 13/225,242, filed Sep. 2, 2011, Ian Rex Binmore.
International Search Report and Written Opinion issued in related International Application No. PCT/US2012/052840 mailed Sep. 9, 2013, 16 pages.
International Preliminary Report on Patentability issued in related International Application No. PCT/US2012/052840 mailed Mar. 13, 2014, 12 pages.

* cited by examiner

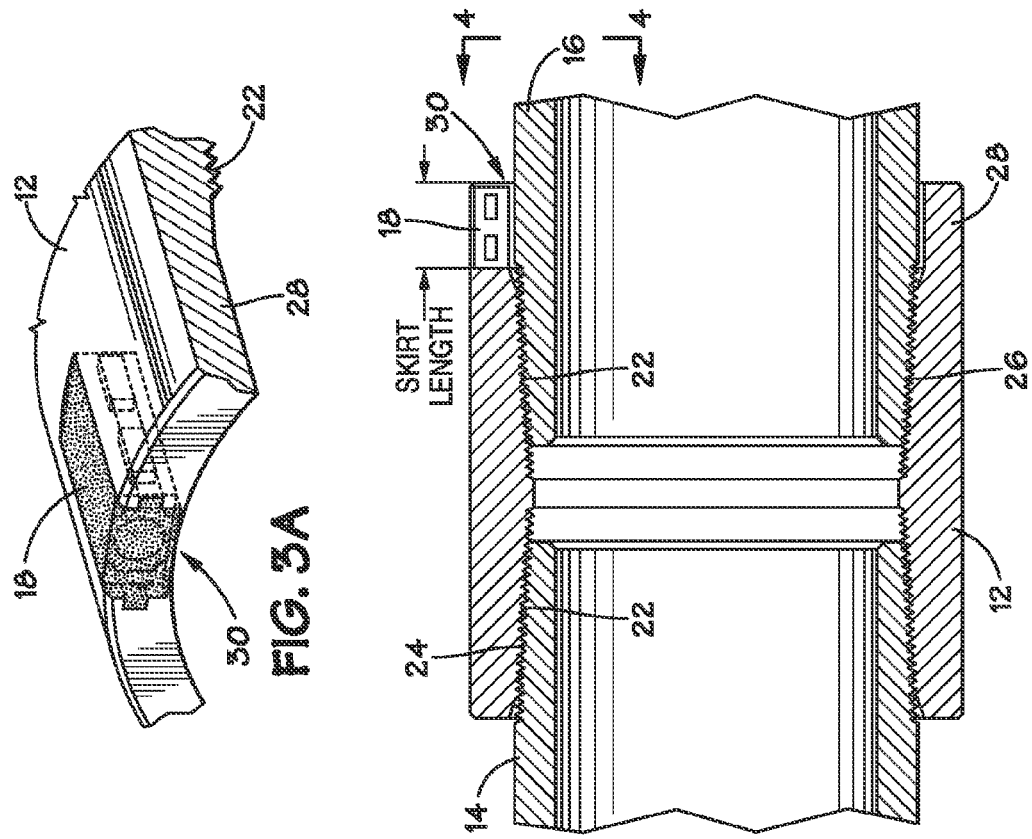
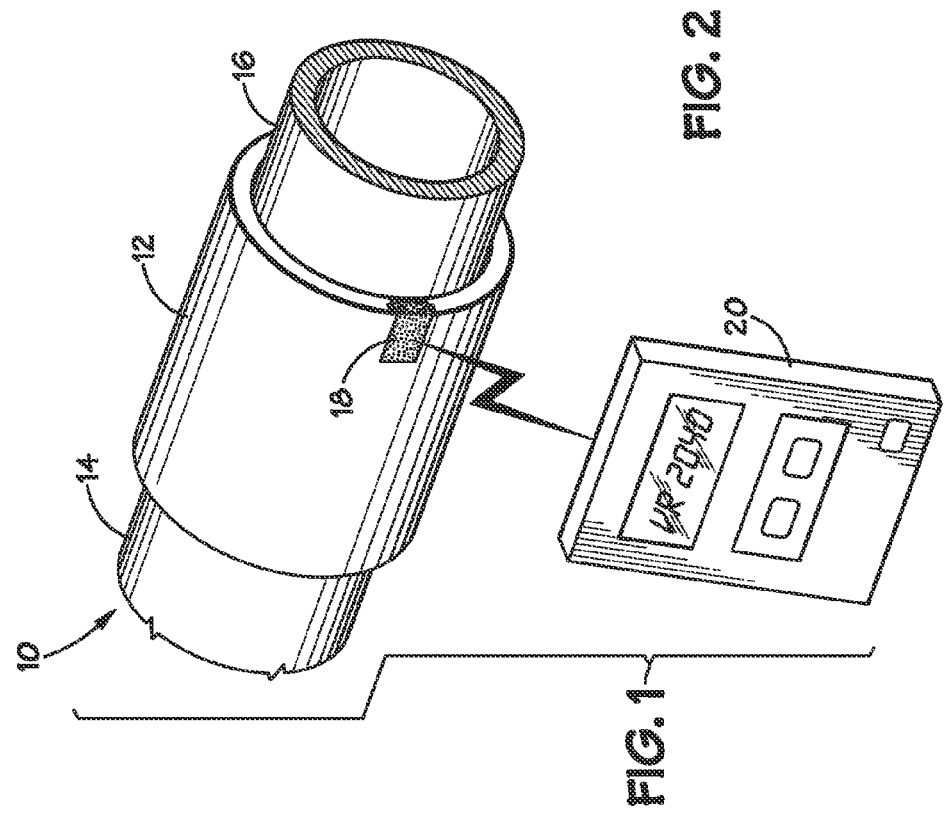

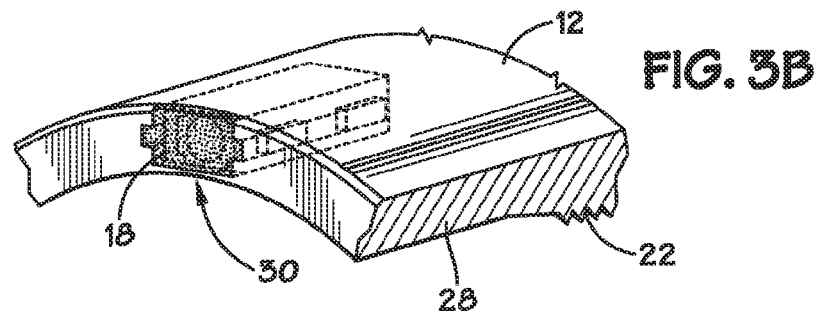
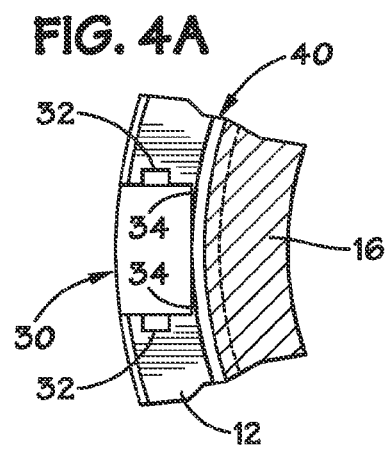
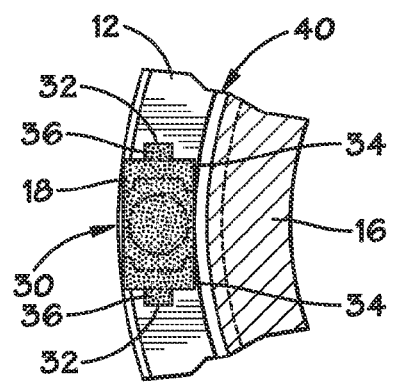
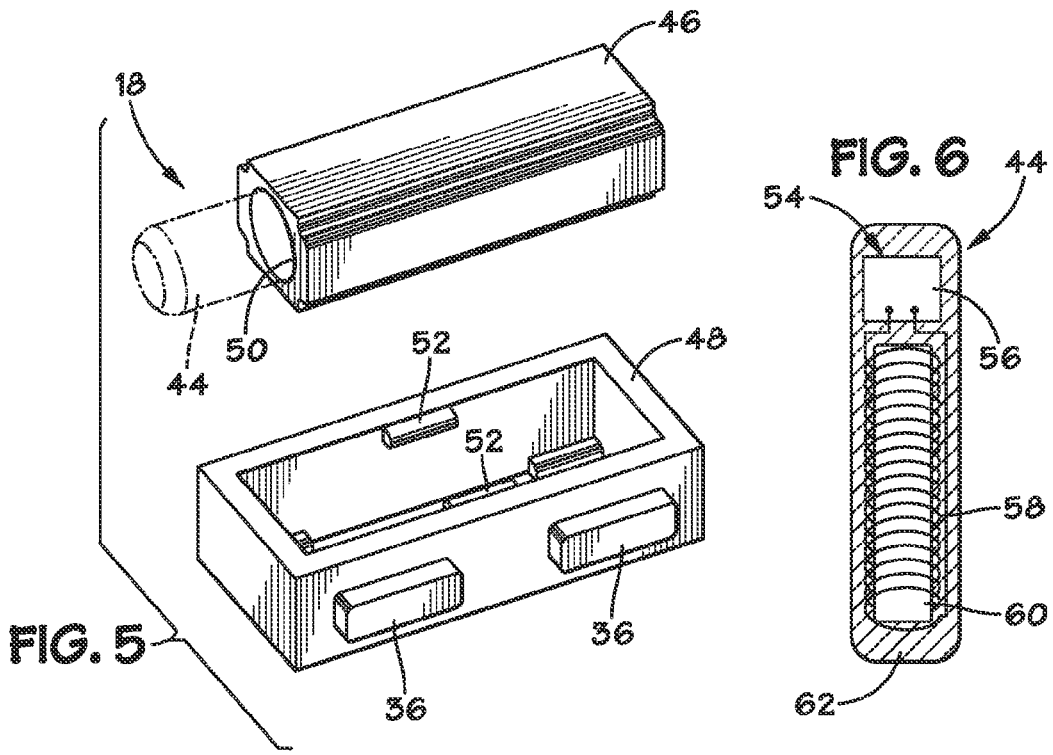

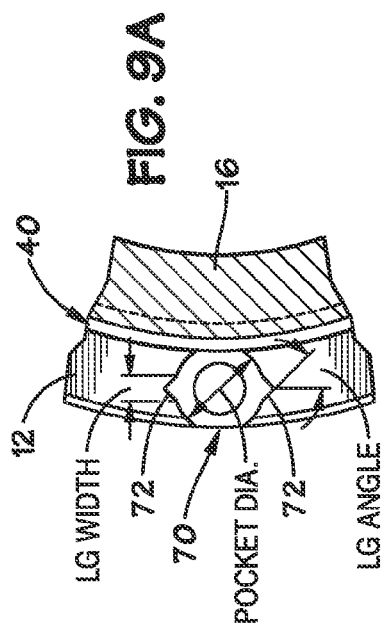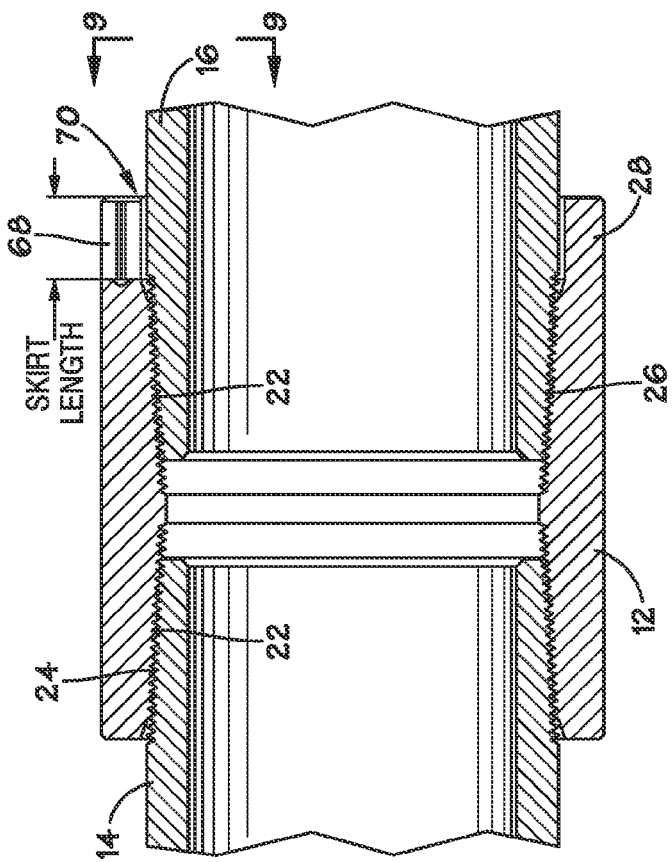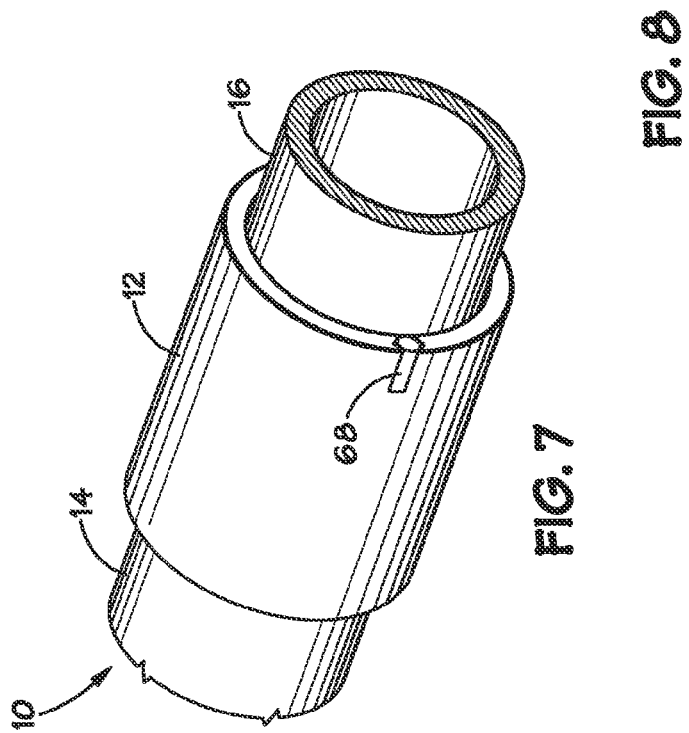

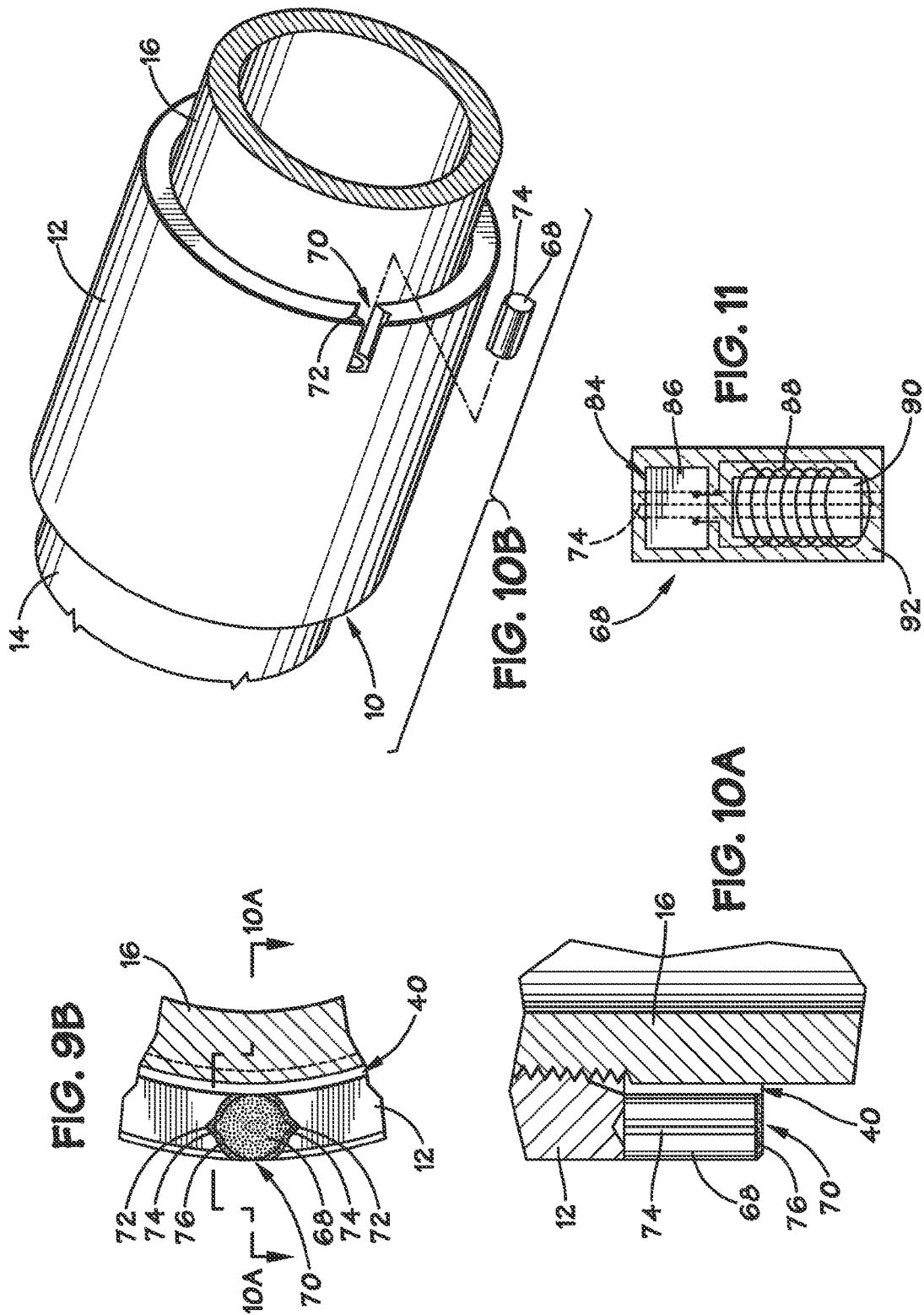

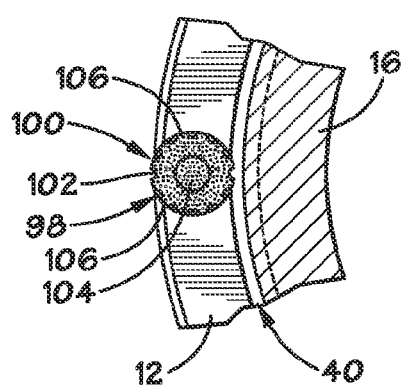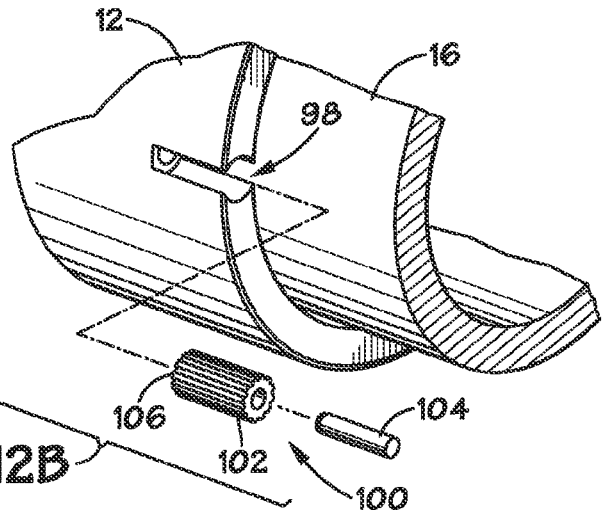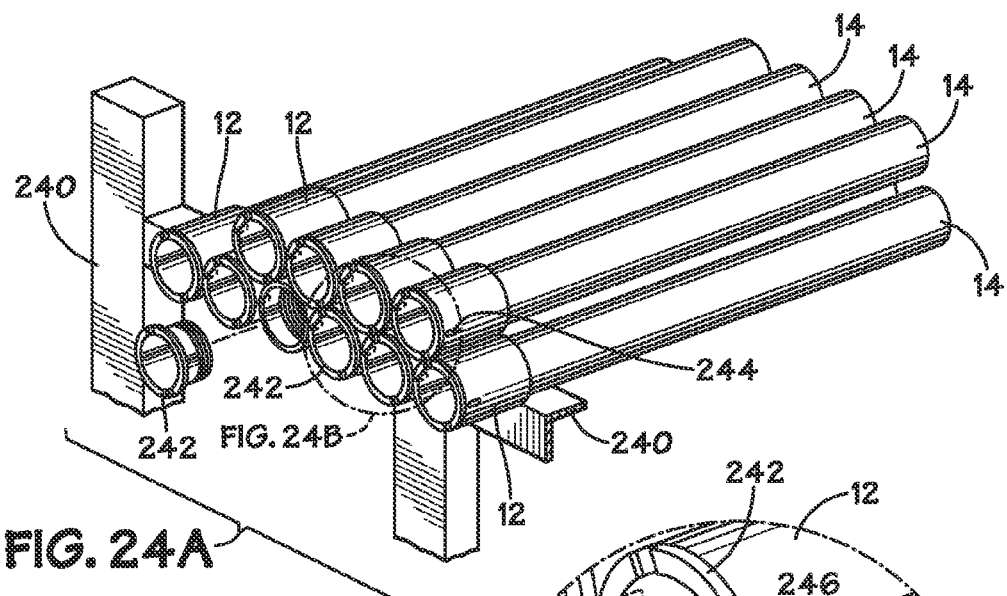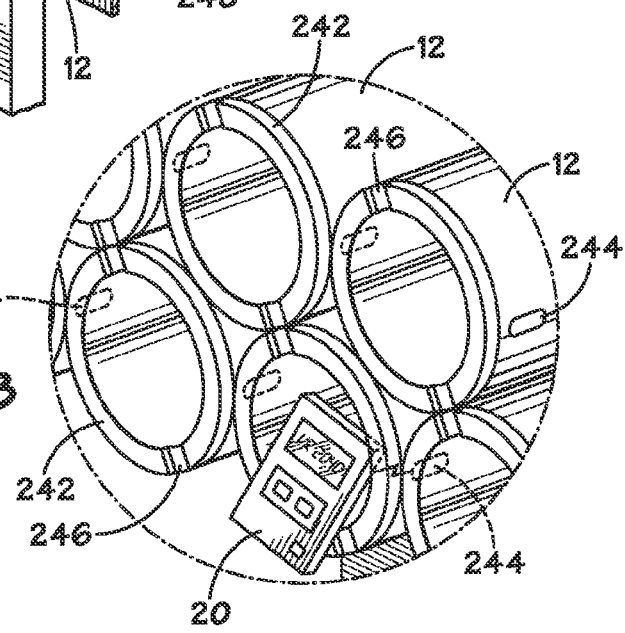

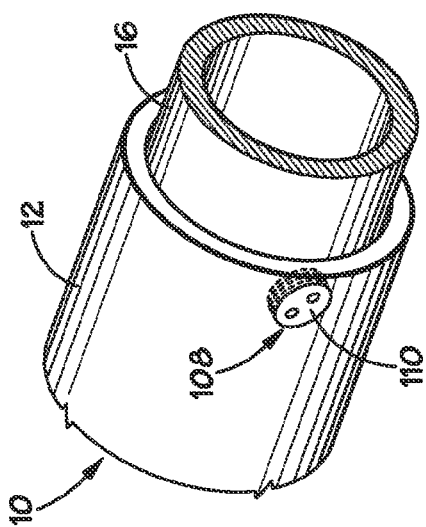
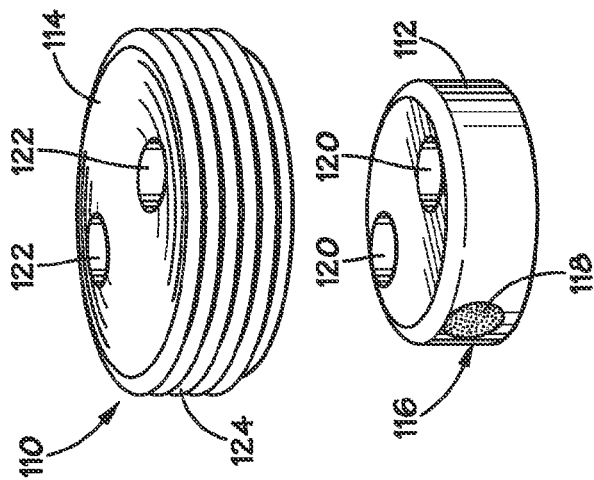
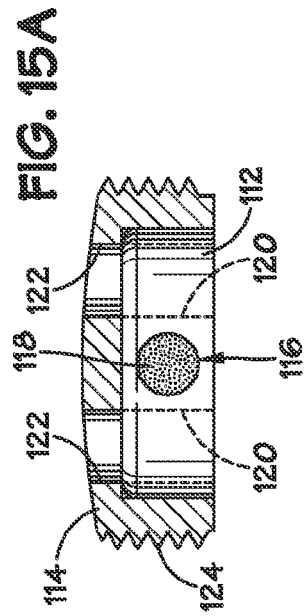
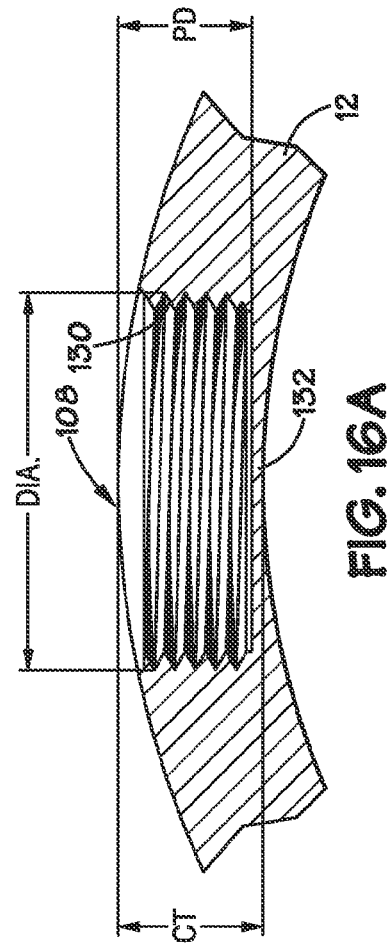

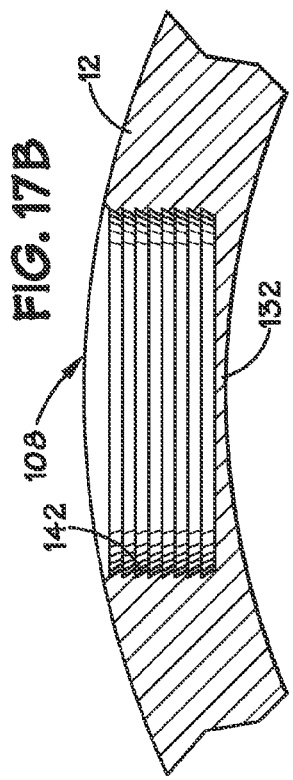
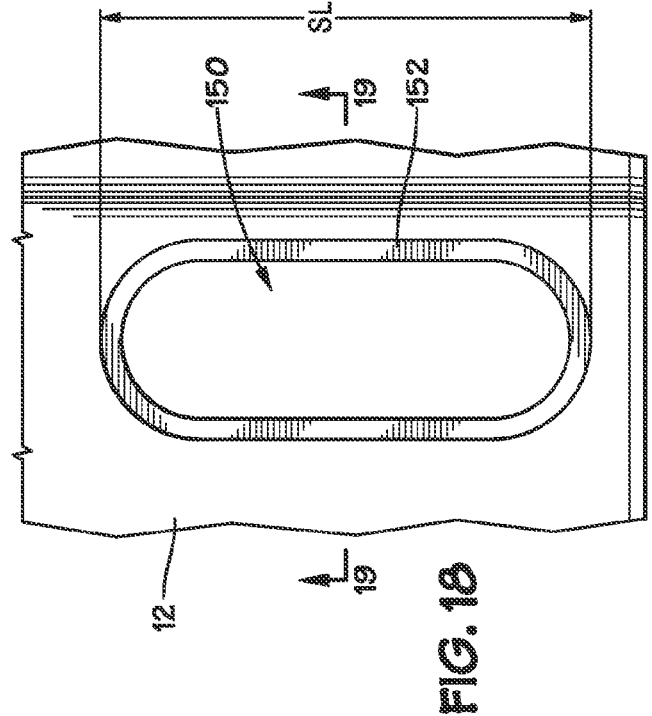
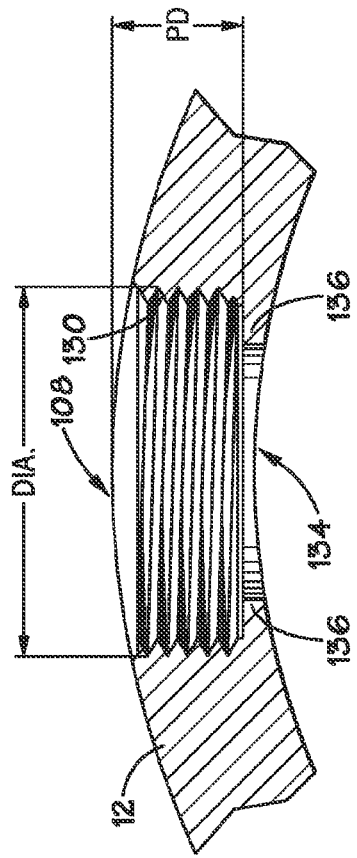
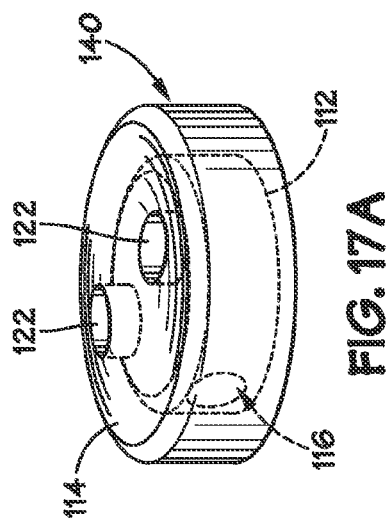

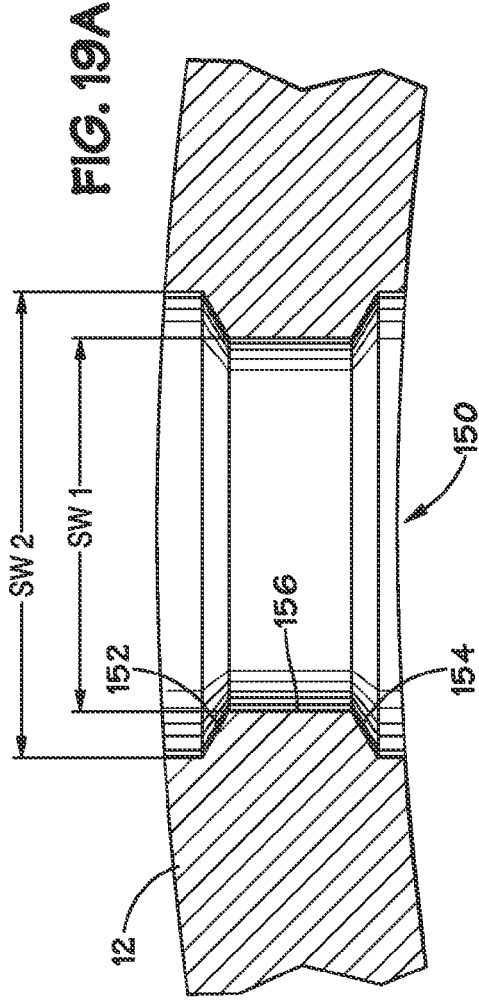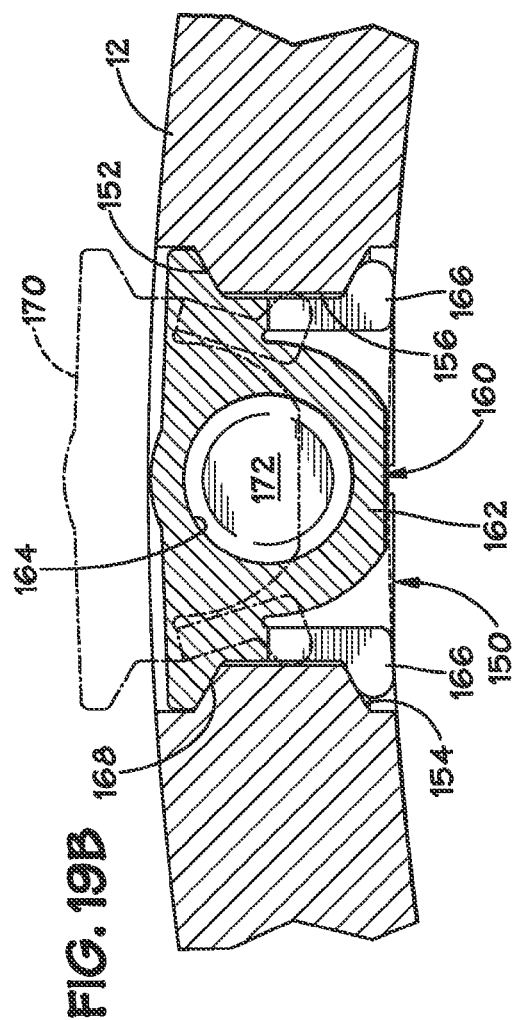

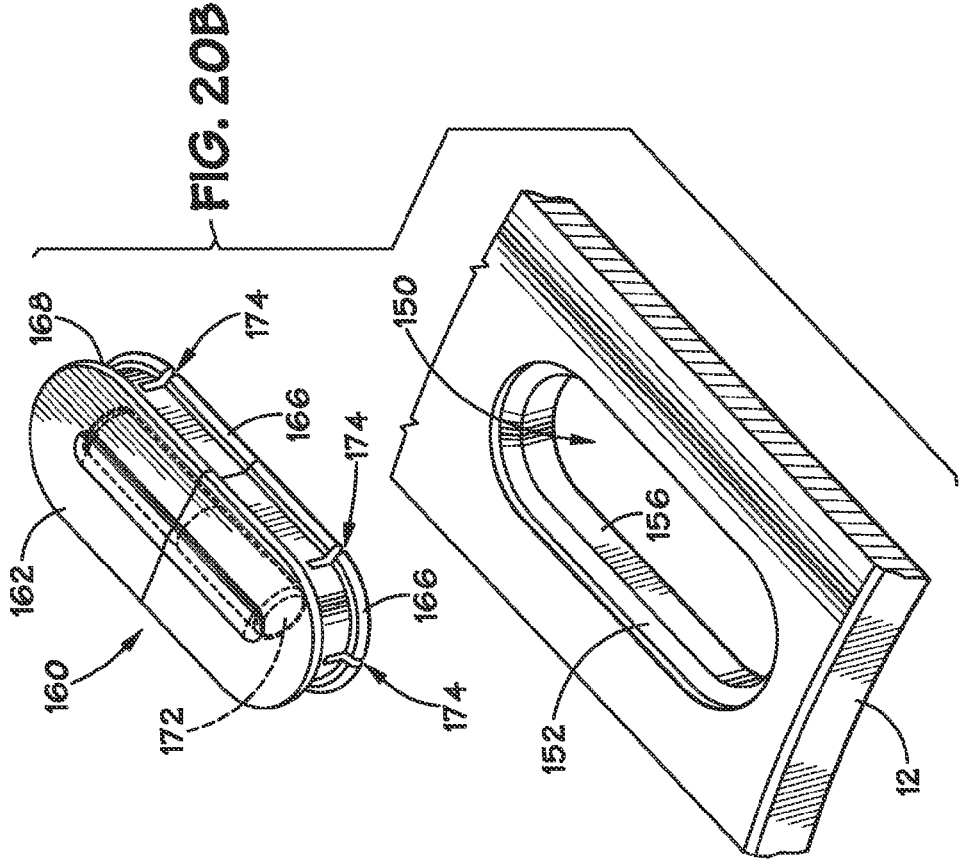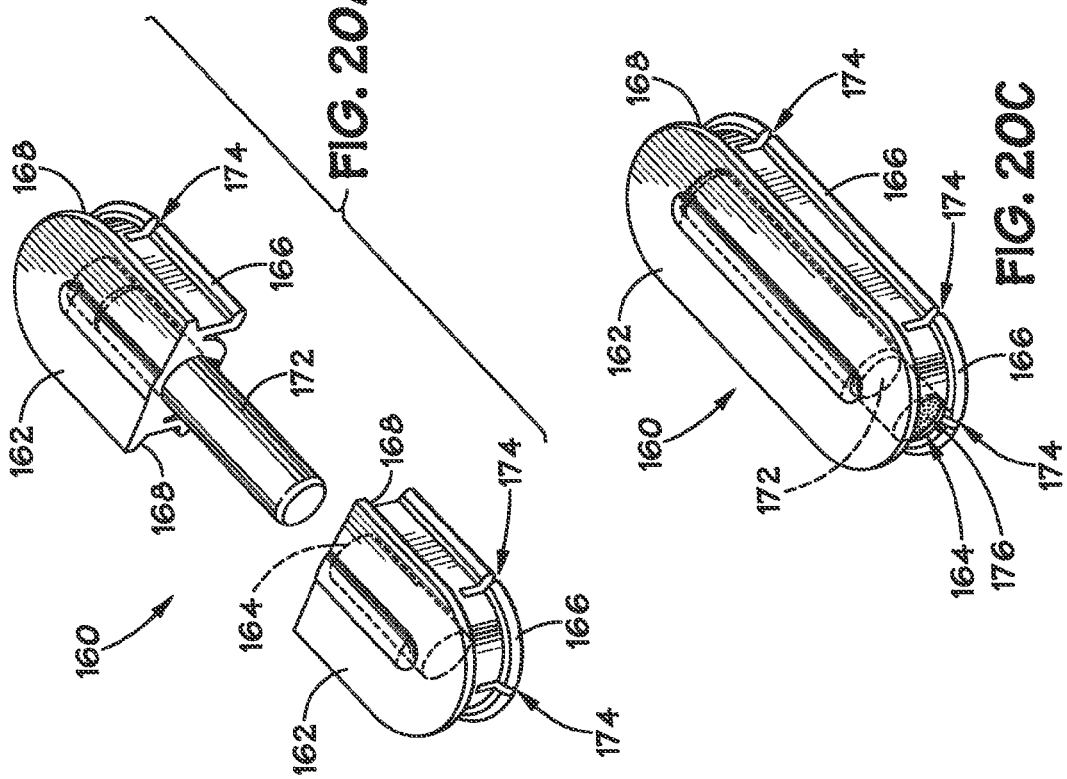

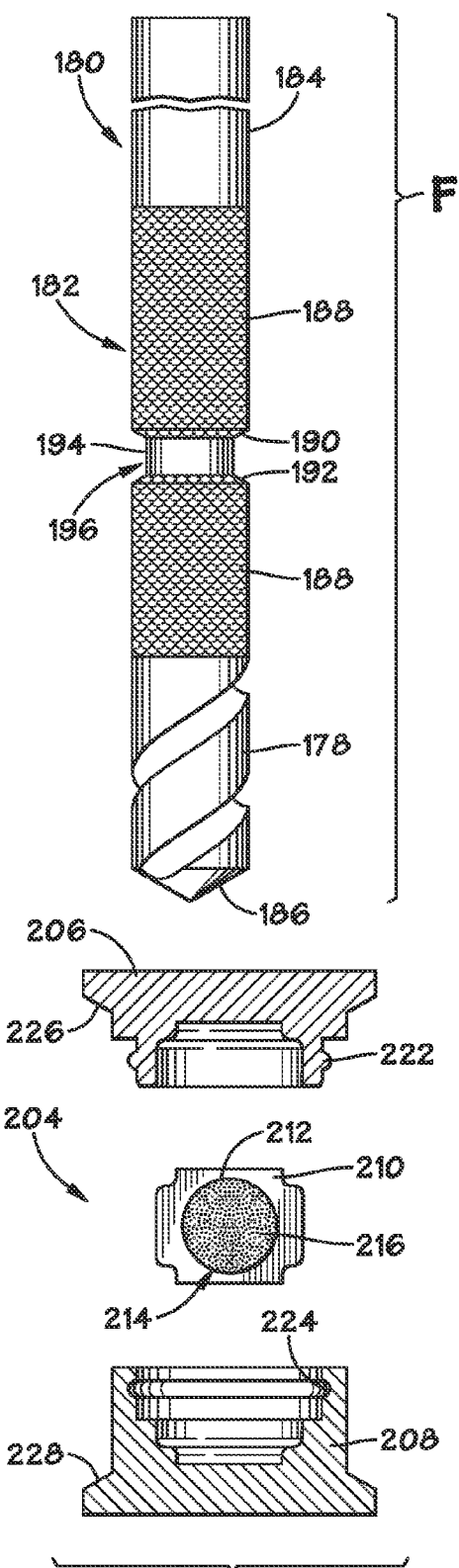
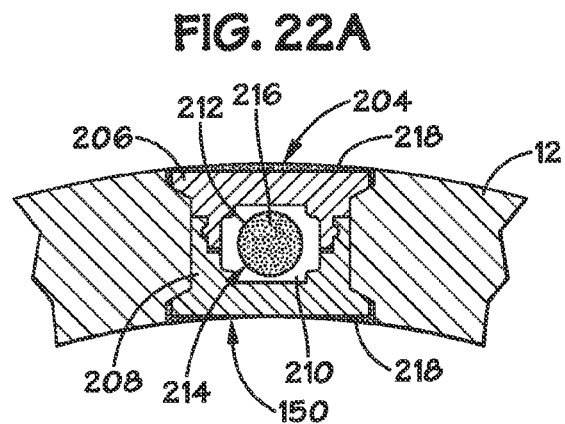
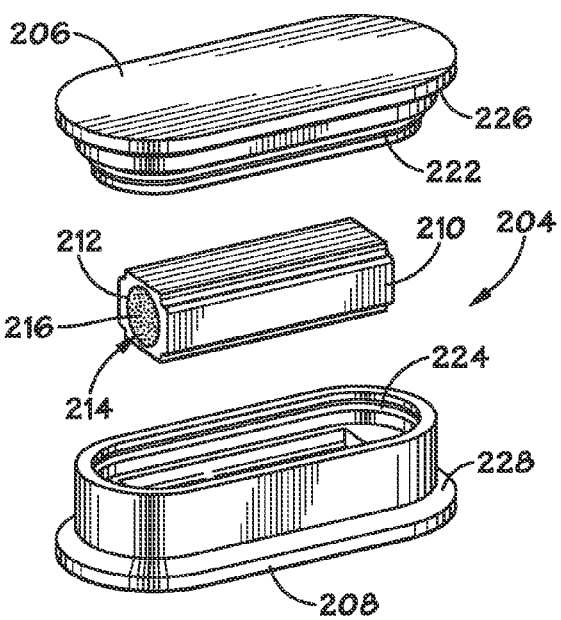

IDENTIFICATION TAGS AND SYSTEMS SUITABLE FOR THIN-WALLED COMPONENTS

BACKGROUND

Field of Invention

Embodiments of the present disclosure relate generally to identification tags and, more specifically in certain embodiments, to identification tags suitable for use in thin-walled tubular goods.

Description of Related Art

This section is intended to introduce the reader to various aspects of art that may be related to various aspects of the present disclosure that are described or claimed below. This discussion is believed to be helpful in providing the reader with background information to facilitate a better understanding of the various aspects of the present disclosure. Accordingly, it should be understood that these statements are to be read in this light and not as admissions of prior art.

Identification tags are often used to manage and track objects, such as system components, tools, machinery, and equipment, through production, inventory, storage, deployment, and product use. One type of identification tag that is commonly used to track objects is a radio-frequency identification (RFID) tag. In general, RFID tags include a microchip or integrated circuit used to store identification (and possibly other) information. An external reader located remotely from the RFID tag is used to receive information from or transmit information to the RFID tag. The RFID tag typically includes an antenna that transmits RF signals relating to the information stored within the RFID tag.

For certain applications, such as surface and downhole oil and gas applications, RFID tags may be utilized to track equipment and inventory, including Oil Country Tubular Goods (OCTG). In some instances, previous tagging technologies may be adequate. But when survival of the RFID tags is desired through routine (and potentially rough) handling of the component in which the RFID tag is installed, or through deployment of a component in a downhole environment, some previous tagging technologies may not be suitable. Additionally, OCTG may present limited space to install an identification tag without impacting its structural integrity and interfering with optimal functioning.

BRIEF DESCRIPTION OF DRAWINGS

Certain embodiments are described in the following detailed description and in reference to the drawings in which:

FIG. 1 illustrates a system including an identification tag installed within a coupling joining two pipes in accordance with one embodiment;

FIG. 2 is a cross-section depicting certain features of the coupling and the pipes of FIG. 1, including a skirt portion of the coupling in which the identification tag is installed;

FIGS. 3A and 3B are perspective views of a portion of the coupling of FIG. 1, including the skirt, and depicts the identification tag installed within different openings in the end of the skirt in accordance with two embodiments;

FIGS. 4A and 4B are elevational views of a portion of the coupling including the opening of FIG. 3A;

FIG. 5 depicts one embodiment of a body of an identification tag that may be installed in the opening of FIG. 3A;

FIG. 6 is a cross-section depicting components of an electronics module of an identification tag that may be received by the tag body of FIG. 5 in accordance with one embodiment;

FIG. 7 illustrates a system including an identification tag installed within a coupling joining two pipes in accordance with one embodiment;

FIG. 8 is a cross-section depicting certain features of the coupling and the pipes of FIG. 7, including a skirt portion of the coupling in which the identification tag is installed;

FIGS. 9A and 9B are elevational views of a portion of the coupling having an opening for receiving an identification tag in accordance with one embodiment;

FIGS. 10A and 10B depict installation of the identification tag within the opening of the coupling of FIG. 7;

FIG. 11 is a cross-section depicting internal components of the identification tag of FIG. 7 in accordance with one embodiment;

FIGS. 12A and 12B generally illustrate installation of a different identification tag in a opening of a coupling in accordance with one embodiment;

FIG. 13 illustrates a system including an identification tag installed in an opening on an exterior, circumferential surface of a coupling in accordance with one embodiment;

FIG. 14 depicts features of a body of the identification tag of FIG. 13 in accordance with one embodiment;

FIGS. 15A and 15B are cross-sections of an inner portion of the tag body of FIG. 14 in accordance with one embodiment;

FIGS. 16A and 16B are sectional views of openings in the coupling of FIG. 13 for receiving the identification tag in accordance with certain embodiments;

FIG. 17A is a perspective view of an identification tag somewhat similar to that of FIG. 14, but having a non-threaded exterior, circumferential surface in accordance with one embodiment;

FIG. 17B is a sectional view of an opening in a coupling having an edge adapted to receive and retain the identification tag of FIG. 17A in accordance with one embodiment;

FIG. 18 is a plan view of portion of a coupling having a slot for receiving an identification tag in accordance with one embodiment;

FIGS. 19A and 19B are sectional views of the slot of FIG. 18 that depict features of the slot and installation of a snap-in tag in accordance with certain embodiments;

FIGS. 20A and 20B depict the snap-in tag of FIG. 19B in accordance with one embodiment;

FIG. 20C depicts another snap-in identification tag that may be installed in the slot of FIG. 18 in accordance with one embodiment;

FIG. 21 illustrates a tool that may be used to form the slot of FIG. 18 in the coupling or another component in accordance with one embodiment;

FIGS. 22A, 22B, and 23 illustrate another identification tag having opposing body portions that may be inserted through opposite ends of the slot of FIG. 18 to install the identification tag in the slot in accordance with one embodiment;

FIG. 24A depicts multiple pipes and attached couplings stacked on a storage rack, the couplings having installed identification tags and covers, in accordance with one embodiment; and FIG. 24B depicts reading of a particular identification tag through a cover on the coupling in which the particular identification tag is installed in accordance with one embodiment.

DETAILED DESCRIPTION

Figure 17C:
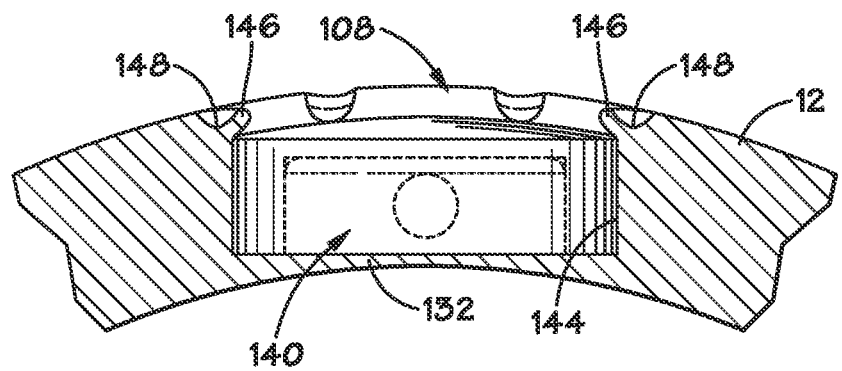
FIGS. 17C and 17D depict an opening in a coupling in which an identification tag is mechanically retained by deformations formed about the opening in accordance with one embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present techniques, the articles "a," "an," "the," and "said" are intended to mean that there are one or more of the elements. The terms "comprising," "including," and "having" are intended to be inclusive and mean that there may be additional elements other than the listed elements. Additionally, the directional terms "upper" and "lower" are used herein for sake of explanation with respect to features in certain figures, but these terms do not require any particular orientation of the described apparatus.

Generally, the presently disclosed embodiments are directed to identification tags and systems including such tags. In certain embodiments, the identification tags may be installed in a pipe coupling joint or in some other tubular member. Particularly, in some embodiments, a coupling includes an extended skirt portion having an opening to receive an identification tag without interfering with the operation of the coupling. The identification tags may be snapped into the opening, slid into the opening, threaded into the opening, or installed in any other suitable manner. Additionally, as described in greater detail below, in some of the presently disclosed embodiments a tag is installed in a coupling in a location (e.g., in the skirt portion or some other portion of the coupling) where negligible or insignificant differential pressures will exist across the tag relative to the strength of the tag containment mechanism) so as to not negatively impact structural integrity of the coupling assembly (e.g., the coupling and attached pipes).

For example, a system 10 with an identification tag is depicted in FIG. 1 in accordance with one embodiment. The system 10 includes a coupling 12 for joining tubular members, such as pipes 14 and 16. In one embodiment, the pipes 14 and 16 may include Oil Country Tubular Goods (OCTG), although other tubular members or non-tubular components may be tagged in accordance with the present techniques in other embodiments. As used herein, OCTG refers to pipe used to case, line, inject, or produce fluids from a well. While OCTG may be used to drill a well, OCTG differs from drill pipe and other "thick-walled" oilfield tubular components in that OCTG are designed to have as large an internal diameter for fluid flows as is practical for a given external diameter. Consequently, OCTG often have relatively thin walls and thin connections to enhance internal flow capabilities. The various identification tags and installation techniques disclosed herein may be suitable for enabling tagging of thin-walled components. But it will be appreciated that the presently disclosed tags and installation techniques are not limited to use with such thin-walled components. Rather, the identification tags and techniques disclosed herein may also be used with other components that are not considered to be thin-walled.

An identification tag 18 is installed in the coupling 12. The identification tag 18 may be any suitable tag for facilitating identification of the coupling, such as a radio-frequency identification (RFID) tag. In the presently illustrated embodiment, the identification tag 18 is installed in an opening in an axial end surface of the coupling 12. But in other embodiments, including some embodiments discussed below, an identification tag may be installed in the coupling in other ways, such as in an opening in a circumferential surface of the coupling 12.

The identification tag 18 (as well as other tags described elsewhere within this disclosure) may be formed of any suitable materials, which may be chosen based on the particular application in which the tag is intended to be used (e.g., one or more of downhole, subsea, surface, high-pressure environment, chemical and fluid phase conditions, or high-temperature environment). In some embodiments, the identification tags described herein may be formed using a high performance thermoplastic, such as PolyEtherEther-Ketone (PEEK). Advantageously, PEEK thermoplastic is highly resistant to chemicals, has high strength, absorbs impacts well, has a high melting point, and maintains a low brittleness at very low temperature. Pigment can be added to the plastic for UV resistance as desired. Alternatively, other radio-transparent materials can be used instead of PEEK thermoplastic, depending on the environmental and operational characteristics of the application. For example, Acrylonitrile Butadiene Styrene (ABS) or other molded plastic could be used under some environmental and operational conditions.

The identification tag 18 may be read wirelessly by a reader 20. In one embodiment, the reader 20 is generally configured to interrogate identification tags, including the identification tag 18. Accordingly, the reader 20 may include a transmitter and a receiver (which may be provided together as a transceiver or separately) for exchanging identification information with identification tags. The reader 20 may also include a processor for receiving the identification data from the tags and extrapolating the data into meaningful data whereby identification or other stored information can be perceived by a user. In certain embodiments, the reader 20 may be integrated with a computer system.

As previously described, the identification tag 18, as well as the other identification tags disclosed herein, may be an RFID tag. For some applications, an optimal communication frequency for the RFID tag is 125-135 kHz, although a different frequency range may be preferred in other applications. And while the presently disclosed identification tags may be described as RFID tags for explanatory purposes, other types of identification tags may also or instead be used in accordance with the present techniques. For instance, identification tags may include low frequency tags, high frequency tags, ultra-low frequency tags, ultra-high frequency tags, ZigBee tags, RuBee or other mesh network tags, surface acoustic wave tags bar code tags, direct part marking tags, or any combination of such tags. That is, the identification tags disclosed herein may alternatively include any suitable identification technology other than RFID technology.

As will be described in greater detail below, the identification tag 18 and other disclosed identification tags may include one or more electronics modules. Each electronics module includes an associated integrated circuit capable of storing and processing identification and other information, as well as manipulating radio frequency (RF) signals (in the case of RFID-based identification tags). The electronics modules of RFID tags further include an antenna for transmitting and receiving RF signals. Such RFID tags may be passive, active, or semi-active. Passive RFID tags rely on the reader to provide the power source for activation. While passive RFID tags may be employed for certain applications, active or semi-active RFID tags may be more suitable for applications where the reader 20 will often be located beyond the communication range of passive RFID tags. If the RFID tag is active or semi-active, the RFID tag may include a battery for transmission of RF signals.

Returning now to the drawings and as may be seen in the cross-section of FIG. 2, the coupling 12 includes opposite ends adapted to receive the pipes 14 and 16. Further, the coupling 12 includes threads 22 that engage complimentary threaded ends 24 and 26 of the pipes 14 and 16. In some embodiments, the coupling 12 may have a relatively thin wall that may make installation of an identification tag in the main body of the coupling more difficult. Accordingly, to accommodate the receipt of the tag 18, in accordance with some embodiments, the coupling 12 includes an extended portion or skirt 28. The skirt 28 may be formed integrally with the rest of the coupling 12, such as depicted in FIG. 2, or may be an additional piece added to the main body of the coupling 12 that includes the threads 22 and facilitates coupling of two pipes together. For example, a separate skirt portion may include internal or external threads on the inner or outer diameter, respectively, of the separate skirt portion with which to engage corresponding threads on the end of the coupling. Such threads (and the respective components on which they are formed) may be configured such that the threaded portions of the skirt and the coupling do not increase the overall diameter of any part of the assembly.

The skirt 28 provides added length to the coupling 12 and may facilitate tagging of the coupling 12. The skirt 28 may have any suitable length that facilitates receipt of the tag 18. For example, in various embodiments the skirt length may be at least 10 mm, at least 15 mm, or at least 20 mm. Additionally, the skirt length may be equal to or exceed a dimension of an identification tag to be received by the skirt 28 such that installation of such a tag (e.g., tag 18) does not impair the structural integrity of the coupling 12 or its functionality with respect to joining of the pipes 14 and 16. Consequently, the term "skirt," when used herein with respect to a coupling or another tubular component that receives an identification tag, means an extension of the coupling or other tubular component that is adapted to receive one or more identification tags in one or more openings therein and is not adapted to engage an additional tubular member joined to the coupling (or other tubular component). For instance, the skirt 28 in FIG. 2 is a portion of the coupling 12 extending beyond the threads 22 and includes an opening 30 for receiving the tag 18.

While opposite ends of couplings are often symmetric, the coupling 12 depicted in FIG. 2 has a skirt 28 on one end but not the other, thereby making the coupling 12 asymmetric. But in other embodiments, the coupling 12 may be symmetric, such as by omitting the skirt 28 or by including a skirt 28 on each end of the coupling 12. And although a single identification tag 18 is installed in the coupling 12 in the present figure, it is noted that identification tags may be installed on either end or each end of the coupling if desired. Further still, couplings of different thicknesses may include skirts 28 having identical thicknesses to facilitate deployment of identification tags that may be installed across multiple couplings of different thickness. And identification tags may also or instead be installed at other locations of the coupling (e.g., in the end of a coupling that does not have an extended skirt portion).

As depicted in FIG. 3A in accordance with one embodiment, the opening 30 may be formed in an axial end surface of the coupling 12 (e.g., the end surface of the skirt 28) and the opening 30 may extend through both an outer surface of the coupling 12 and inner surface of the coupling 12. But in other embodiments, the opening 30 may differ. For instance, the opening 30 may be formed in an axial end surface of the coupling 12 without extending to the outer surface or the inner surface of the coupling 12, as generally depicted in FIG. 3B. Alternatively, the opening 30 formed in an axial end surface of the coupling 12 may extend to only one of the outer and inner surfaces of the coupling 12.

As generally depicted in FIGS. 4A and 4B in accordance with one embodiment, the opening 30 may include grooves 32 that receive mating features 36 (e.g., tabs or ribs) of the tag 18 to facilitate alignment and retention of the tag 18 within the opening 30. The opening 30 may also define shoulders 34 of the coupling 12 that abut the tag 18 during installation. The end of the coupling 12 (e.g., at the skirt 28) is spaced apart from the pipe 16 to define an annular space 40. The annular space 40 within the coupling 12 is open to the environment outside the coupling 12. Accordingly, the annular space 40 allows pressure on each side of the coupling 12 about the opening 30 to equalize, thereby reducing stress on the tag 18 in the opening 30.

Some embodiments of the presently disclosed tags, including tag 18 and other tags described below, may be used in couplings in a manner to reduce or eliminate issues of alternative designs where differential pressure across the material where the tag is installed may cause problems with pipe integrity. The presently disclosed embodiments may be deployed into OCTG in locations and with methods where negligible, or insignificant differential pressures will exist across the tag relative to strength of the tag containment mechanism. While such locations may include a location in a skirt as described herein, it is noted that the locations may instead include other portions of a component. For instance, some coupling configurations may allow minimal stresses to occur at the end of the couplings, allowing the coupling to receive a tag at the end of the coupling in a shorter skirt portion or at the end of the coupling without any skirt. When a tag is installed within a coupling skirt, the tag will tend to be in equilibrium across the retention mechanism within its designed pressure-use environment, reducing the likelihood that the tag may dislodged from skirt due to pressure differences.

Further, the tags may be generally well protected from standard or even abusive handling during routine operations prior to the tagged components utilization in its intended application, such as a downhole application. Also, the retention mechanisms, when deployed with appropriate materials such as divulged herein, may withstand the rigors of pressure differentials caused by fluid flow on one side of the installed tag and mechanical interactions of running the OCTG into or out of a well or with service equipment which may be run in a well of tagged pipe. Additionally, some embodiments of tag placement for surface and downhole survival are benign to the stress, corrosional, and operational design of the applicable equipment.

One example of an identification tag 18 is provided in FIG. 5 in accordance with one embodiment. Particularly, in this example, the tag 18 is an oblong tag that includes an inner body or carrier 46 for receiving an electronics module or bead 44 and includes an outer body or shell 48. The electronics module 44 may be inserted into a cavity 50 of the inner body 46. In turn, the inner body 46 may be received in the outer body 48 and retained by clips 52. One or more of the inner body 46, the outer body 48, and the clips 52 may be resilient to facilitate receipt and retention of the inner body 46 by the outer body 48. The outer body 48 may also include suitable mating features 36 that cooperate with grooves 32 of the opening 30, as discussed above.

As depicted in FIG. 6, the electronics module or bead 44 of one embodiment includes electronics 54 that enable communication between an identification tag (e.g., tag 18) and a tag reader (e.g., reader 20). The electronics 54 may include an integrated circuit 56 and an antenna 58 wound about a suitable core 60, such as a ferrite core. In one embodiment, the antenna 58 and the core 60 function as a dipole and may provide desirable performance when installed partially within particular geometries of radio-opaque material, such as steel (e.g., in a steel coupling or other OCTG), where limited RF signal propagation may be a concern. Particularly, such an arrangement may enable longer read distances. The antenna 58 may be bonded to the integrated circuit 56, which includes stored identification information for the tag that may be read by the reader 20. The integrated circuit 56 includes any suitable memory or means for storing the identification information, such as an erasable, programmable, read-only memory (EPROM) or hard coded non-volatile internal chip identifiers.

The electronics module 44 may also include one or more protective materials 62 in which the integrated circuit 56, the antenna 58, and any other electronics or other components may be disposed to increase durability. For instance, in one embodiment, the electronics may be disposed within an impermeable bead made of high-purity, industrial-grade glass. The protective material 62 may also include a glass enclosure filled with a silicone gel or some other material, a plastic body, some other encapsulant, or the like.

In another embodiment generally depicted in FIGS. 7-11, the coupling 12 of the system 10 may instead be tagged with an identification tag 68. Similar to the embodiments of FIGS. 1-6, the present coupling 12 includes threads 22 to engage complementary threaded ends 24 and 26 of pipes 14 and 16. The coupling 12 of this embodiment also includes an extended skirt 28. But in the presently illustrated embodiment, the skirt 28 has a different opening 70 for receiving the identification tag 68. As illustrated in FIGS. 8, 9A, and 9B, the identification tag 68 and the opening 70 have generally cylindrical profiles. Further, the opening 70 may include landing grooves 72 that are configured (e.g., with a width (LG WIDTH) and angle (LG ANGLE)) to receive mating ribs 74 of the identification tag 68.

The installed tag 68 may be retained within the opening 70 via the ribs 72 and an adhesive 76. An amount of adhesive 76 may be injected into the opening 70 between the tag 68 and the coupling 12 after the tag 68 is inserted in the opening 70, or may be injected into the opening 70 before installation of the tag 68 such that insertion of the tag 68 causes the adhesive 76 to flow about the tag 68 within the opening 70. As depicted in FIG. 10A, the adhesive 76 may also cover the end of the tag 68 to fully enclose the tag 68 within the opening 70. Similar to the tag 18, the tag 68 may be installed by aligning the ribs or other mating features 74 with the grooves 72 of the opening 70 in an axial end surface of the coupling 12 (e.g., at the edge of the skirt 28) and may be inserted into the opening 70 by moving the tag 68 in a direction substantially parallel to the axis of the coupling 12.

As depicted in FIG. 11, the tag 68 may include electronics 84 for wirelessly communicating with a tag reader. The electronics 84 may be similar to the electronics 54 (FIG. 6) in that they include an integrated circuit 86 and an antenna 88 wound about a suitable core 90 to provide the functionality described above with respect to FIG. 6. A protective material 92, such as a thermoplastic, may encase the electronics 84 to increase durability.

In another embodiment, the coupling 12 may include an opening 98 adapted to receive a tag 100, as generally depicted in FIGS. 12A and 12B. The tag 100 has a substantially cylindrical body 102 configured to receive an electronics module 104 having suitable electronics for wirelessly communicating with a reader as described above. But in other embodiments, the electronics module 104 may be integrally formed within the body 102 rather than being a separate component. The body 102 includes multiple longitudinal ribs 106 on its exterior surface to engage the coupling 12 when the tag 100 is inserted into the opening 98. Particularly, in one embodiment, the width of the body 102 including the ribs 106 is slightly greater than the diameter of the opening 98. In such an embodiment, the insertion of the tag 100 therein may cause compression of the ribs 106 and facilitate retention of the tag 100 within the opening 98. The ribs 106 may include tapered ends to facilitate alignment and insertion of the tag 100 in the opening 98. Additionally, an adhesive may also be used in the opening 98 to retain the tag 100.

In still another embodiment, the system 10 may include a tag 110 installed in an opening 108 of the coupling 12, as generally depicted in FIG. 13. The opening 108 may be formed in an exterior, circumferential surface of the coupling 12, such as in a skirt 28 or another portion of the coupling 12. The tag 110 may be installed by generally moving the tag 110 along a normal perpendicular to the coupling 12. Or more specifically, the tag 110 may be inserted into the opening 108 along a radial direction of the coupling 12. As depicted in FIGS. 14, 15A, and 15B, the identification tag 110 may include an inner body or carrier 112 and an outer body or shell 114. The inner body 112 may include a cavity 116 for receiving an electronics module or bead for enabling wireless communication (such as those described above). The electronics module may be enclosed within the cavity 116 with an adhesive or other encapsulant 118. The inner body 112 may include one or more through holes 120 that may be aligned with apertures 122 of the outer body 114 upon insertion of the inner body 112 into the outer body 114. The through holes 120 and apertures 122 allow equalization of pressure about opposite surfaces (e.g., upper and lower surfaces) of the tag 110.

In some embodiments, the outer body 114 may include exterior circumferential threads 124 configured to engage complementary threads 130 of the opening 108, as depicted in FIGS. 16A and 16B. In this manner, the tag 110 may be screwed into the opening 108 and retained therein by mating engagement of the threads 124 and 130 (although adhesive or other manners of retention may also be used). The opening 108 may be any appropriate size to receive and retain the identification tag 110. For example, the diameter of the opening 108 depicted in FIGS. 16A and 16B may be substantially equal to the diameter of the identification tag 110. In the embodiment of FIG. 16A, the opening 108 (which may also be referred to as a pocket) has a pocket depth PD less than the coupling thickness CT of coupling 12, thus leaving some material 132 of the coupling 12 between an installed identification tag 110 and the interior of the coupling 12. In such embodiments, the through holes 120 and apertures 122 allow equalization of pressure between space below the installed tag 110 (i.e., between the tag 110 and the material 132) and an exterior environment about the coupling 12.

In another embodiment, the opening 108 may be formed entirely through the coupling 12, as generally depicted in FIG. 16B. In this embodiment, the opening 108 includes a bore 134 extending through the inner most portion of the wall of the coupling 12. Additionally, the diameter of the bore 134 may be less than the diameter (DIA.) of the opening 108 at the threads 130 to form a stop 136 that may engage the tag 110 when installed within the opening 108.

Figure 17D:
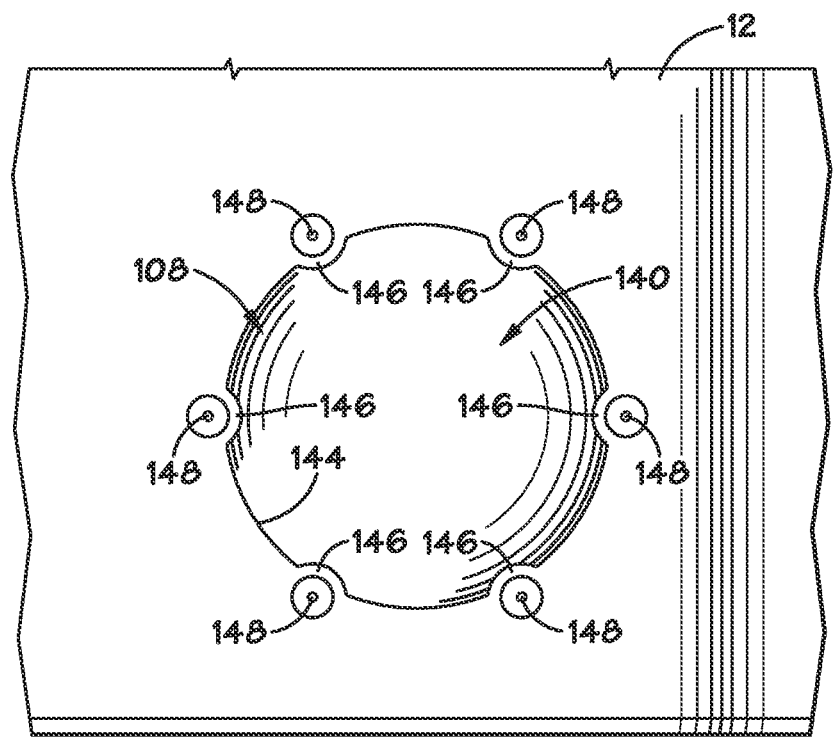

In another embodiment depicted in FIGS. 17A and 17B, an identification tag 140 may include an outer body 114 without threads 124. The tag 140 may be press fit into the opening 108 of FIG. 17B. To facilitate retention, the opening 108 of FIG. 17B may include a knurled edge 142 adapted to engage and retain the outer circumferential surface of the outer body 114 of tag 140. Or as in the embodiment of FIGS. 17C and 17D, the tag 140 (or some other tag, such as tag 110) may be installed in the pocket or opening 108 and an edge of the pocket between wall 144 and the surface in which the opening is formed (e.g., the outer surface of the coupling 12) may include one or more deformations 146 (e.g., one or more lips) to mechanically retain the installed tag in the opening 108. The one or more deformations 146 may be continuous (e.g., one lip around the perimeter of the opening 108) or broken, and may include "point" deformations at one or more locations about the opening 108 as depicted in FIG. 17D. Although the opening 108 is depicted as a round opening in FIG. 17D, it will be appreciated that the opening could be any desired shape. Also, the deformations 146 may be formed in any suitable manner, such as peening of the material at points 148.

In some additional embodiments, identification tags may be configured to snap into an opening in a component. For example, as depicted in FIG. 18, a slot or opening 150 may be formed in a wall of the coupling 12, such as in the skirt 28 of the coupling 12. In the presently illustrated embodiment, the opening 150 is formed near an end of the coupling 12 but does not extend up to the axial edge of the coupling 12. The slot or opening 150 may be of any appropriate size and may have a slot length SL sized to receive an identification tag of similar length. In one embodiment, for example, the slot length SL may be between 17 mm and 19 mm (e.g., about 18 mm).

As depicted in FIG. 18, as well as FIGS. 19A and 19B, the coupling 12 includes a tapered upper shoulder 152 defined by the opening 150. Particularly, as depicted in FIGS. 19A and 19B, the opening 150 includes a bore 156 defining a tapered upper shoulder 152 and a tapered lower shoulder 154. In the depicted embodiment, the opening 150 includes a stepped bore 156 in which the opening 150 includes a slot width SW1 at its narrowest point perpendicular to the slot length SL and a larger slot width SW2 (also perpendicular to the slot length SL) at the ends of the opening at the inner and outer surfaces of the coupling 12. In one embodiment, the slot width SW1 may be between 5 mm and 7 mm (e.g., 6.35 mm) and the slot width SW2 may be between 7 mm and 9 mm (e.g., 7.94 mm). Additionally, the thickness of the wall in which opening 150 is formed may be between 4 mm and 6.5 mm in one embodiment, between 6 mm and 9 mm in another embodiment, and between 9 mm and 26 mm in an additional embodiment.

As depicted in FIG. 19B, an identification tag 160 may be installed into the opening 150. Particularly, the identification tag 160 may be configured to snap into the opening 150 and engage the coupling 12. The identification tag 160 includes a body 162 with a central portion having a cavity 164 for receiving an electronics module 172. Additionally, the identification tag includes a resilient extension 166 spaced apart from the central body. For example, the resilient extension 166 may include legs or a skirt portion spaced apart from the central body portion with the cavity 164. The resilient extension 166 may include a lower flange and the identification tag 160 may also include an upper flange 168. As depicted, these flanges may engage the tapered upper and lower shoulders 152 and 154 to retain the tag 160 within the opening 150. As generally indicated by the phantom profile 170, the tag 160 may be installed into the coupling 12 by deforming the resilient extension 166 such that the central body and the resilient extension may be fit into and through the bore 156. As the lower flange of the resilient extension clears the narrowest portion of the bore 156 and moves into the installed position depicted in FIG. 19B, the resilient extension 166 may expand outwardly such that the lower flange engages the tapered lower shoulder 154.

Additional details of the tag 160 are provided in FIGS. 20A-20C in accordance with certain embodiments. As depicted in FIG. 20A, the electronics module 172, which may be identical or similar to the electronics module 44 or other modules previously described, may be received in the cavity 164 of the tag 160. The body 162 of the tag 160 may be a two-piece body such that one end of the electronics module 172 may be inserted into one part of the two-piece body, while the other end of the electronics module 172 may be received in the other part of the two-piece body. In this embodiment, the resilient extension 166 may be provided in the form of a skirt and may include various notches 174 to facilitate deformation and deflection of the skirt during installation of the tag 160 into the opening 150.

Although the two pieces of the body 162 of FIGS. 20A and 20B are depicted as being generally equal in size, it will be appreciated that other embodiments may include a two-piece body in which the two pieces differ in size. For instance, the body 162 may be split at two-thirds or three-quarters of the length of the body 162. In one embodiment, the split may occur at the end of the cavity 164 within the body such that a cap is created which will shear off any excess fill around an internal bead, leaving an assembly with minimal (i.e., little or no) void space. In such an embodiment, the cylindrical cavity 164 within the housing may be asymmetrically placed along the long axis of the housing rather than symmetrically placed along the long axis, in order to allow a cap assembly that shears the fill material after a bead is installed into the cavity. Additionally, in other embodiments, the body 162 may include more than two pieces.

In another embodiment generally depicted in FIG. 20C, the body 162 may be a single piece body in which the cavity 164 extends to an exterior surface of the body 162. Such an arrangement would allow the electronics module 172 to be inserted through the end of the body 162 and retained within the opening 150 by the surface of the bore 156 when the tag 160 is installed, by an adhesive 176, or both.

The opening 150 may be formed in any suitable manner. For example, an embodiment of a tool 180 for forming such an opening 150 is depicted in FIG. 21 in accordance with one embodiment. The tool 180 includes a cutting end 182 on a shank 184. The cutting end 182 includes a first cutting surface 186 for boring into a wall of a component, such as the skirt 28 of the coupling 12. The first cutting surface 186 may be provided in the form of a fluted drill bit end 178 (as depicted in FIG. 21), in the form of a cutting mill-type end, or in some other form. Second cutting surfaces 188 may be provided on circumferential surfaces of the shank 184 to allow cutting of the component to form an elongated slot, such as the opening 150. Particularly, the inclusion of the second cutting surfaces 188 with the first cutting surface 186 allows an operator to move the tool 180 in a first direction perpendicular to a surface of a wall of a component to bore a hole through the wall and then move the tool 180 in a second direction perpendicular to the first direction, without removing the tool 180 from the component, to remove material from the wall and form an elongated slot. The cutting end 182 at the second cutting surfaces 188 may be sized such that its diameter is equal to the desired slot width SW2 of opening 150 (e.g., 0.25 inches).

Additionally, third and fourth cutting surfaces 190 and 192 may be provided on oppositely tapered surfaces of the shank 184 and be separated by a circumferential edge 194 without a cutting surface. Once a second cutting surface 188 is used to form the elongated slot, the stepped profile 196 may be aligned with the wall of the component to enable an operator to simultaneously cut the shoulders 152 and 154 into opposite sides of the wall of the component to form the stepped bore 156 of the opening 150. Consequently, the tool 180 may be inserted into the component and used to form the entire slot 150, including cutting the shoulders 152 and 154, without removing the tool from the component. The dimensions of the tool 180 may vary depending on the sizes of the slot to be formed, the component, and the intended tag. In one embodiment, the tool 180 may be a bit with a length of three inches, the drill bit end 178 may be 0.5 inches in length (measured from the tip of the tool 180 at drill bit end 178 to the beginning of the lower, second cutting surface 188 in FIG. 21), the lengths from the end tip of drill bit end 178 to the opposite ends of the lower and upper second cutting surfaces 188 may be 0.9 inches and 1.6 inches (respectively), and the non-cutting edge 194 may have a diameter of 0.188 inches and a length of 0.082 inches between the tapered surfaces of the third and fourth cutting surfaces 190 and 192, which may be formed at an angle of sixty degrees with respect to the edge 194. The foregoing measurements are approximate, and are provided merely as one example of the form a tool 180 may take. Other tools 180 may have different dimensions or forms in full accordance with the present techniques.

An additional embodiment of an identification tag is provided is FIGS. 22A, 22B, and 23. Particularly, in the depicted embodiment, an identification tag 204 includes a multi-part body with outer body portions 206 and 208. The body portions 206 and 208 may receive a carrier or inner body portion 210 with a cavity 212 for receiving an electronics module 214. The electronics module 214 may be retained within the carrier 210 via adhesive or encapsulant 216. Similarly, when installed in the opening 150 in coupling 12 (e.g., within the skirt 28 of the coupling 12), an adhesive or encapsulant 218 may be used to help retain the tag 204 within the opening 150.

The outer body portions 206 and 208 may include a snap 222 that works in conjunction with a mating portion 224 such that the body portions 206 and 208 may snap together about the electronics module 214 and the carrier 210. Particularly, the carrier 210 may be positioned in an appropriate recess of the body portion 206 and inserted through one side (i.e., from either an exterior side or an interior side of the coupling 12) and the body portion 208 may be inserted into the other side of the opening 150. The two body portions 206 and 208 may then be snapped together within the opening 150 to retain the tag 204 therein. The body portions 206 and 208 may include flanges 226 and 228 that cooperate with corresponding shoulders in the opening 150 of the coupling 12.

In another embodiment, as generally depicted in FIGS. 24A and 24B, the inclusion of an identification tag in a tubular component (e.g., a coupling) facilitates reading of specific identification tags in a stacked arrangement of tubular members. For example, as depicted in FIG. 24A, multiple pipes 14 with attached couplings 12 may be stacked on a storage rack 240. Further, covers 242 for protecting the threads of the couplings 12 may be installed onto the field end of the couplings 12 (i.e., on the ends of the couplings opposite the pipes 14). These covers 242 (or "thread protectors") may be formed of any suitable material, although non-radio-opaque materials such as plastic enable the reading of tags through the thread protectors when they remain installed into the couplings, facilitating the identification of the unique members of the stacks of pipe. The thread protectors may extend within the couplings 12 adjacent wireless identification tags 244 also installed in the field end of the couplings 12 (e.g., within a skirt portion on the field end of the couplings 12). The wireless identification tags 244 may include any of the tags disclosed herein or may include different tags. The covers 242 may include tool slots 246 (FIG. 24B) to facilitate attachment and disconnection of the covers 242 from the couplings 12 using an appropriate tool.

In one embodiment, and as generally depicted in FIG. 24B, all or a portion (e.g., an antenna) of a tag reader 20 may be aligned with a specific coupling 12 on the storage rack 240. For instance, the tag reader 20 in FIG. 24B is aligned with and at least partially inserted into the bore of one of the couplings 12 to read information from the wireless tag 244 installed in that coupling 12. In one embodiment, the wireless tags 244 are identical to identification tags 160 and are installed through openings in the couplings 12 such that each identification tag is exposed on both an exterior and an interior surface of the coupling 12 in which it is installed.

Advantageously, the portion of the tag reader 20 inserted into the bore may include an antenna of the tag reader 20. In embodiments in which the material of the tubular members inhibit propagation of wireless communication signals (e.g., steel tubular members), aligning or inserting the reader 20 into a particular coupling 12 allows the reader 20 to read information through a non-RF-opaque thread protector 242 from the tag 244 installed that particular coupling 12. Additionally, the bodies of the couplings 12 inhibit communication of wireless signals between the reader 20 and other tags 244 installed in the other couplings 12, thus reducing the chance of accidently reading information from an unintended tag 244 and reducing interference.

While the invention may be susceptible to various modifications and alternative forms, specific embodiments have been shown by way of example in the drawings and have been described in detail herein. Various refinements of the features noted above may exist in relation to various aspects of the subject matter described herein. Further features may also be incorporated in these various aspects as well. These refinements and additional features may exist individually or in any combination. For instance, various features discussed above in relation to one or more of the illustrated embodiments may be incorporated into any of the described embodiments of the present disclosure alone or in any combination. Accordingly, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a coupling of an Oil Country Tubular Good to join two tubular members to one another, the coupling including a circumferentially outer surface, a first end including a first engagement portion to receive one of the two tubular members, and a second end including a second engagement portion to receive the other of the two tubular members,
a skirt portion that extends in an axial direction of the coupling beyond the first engagement portion, the skirt portion including inner or outer threads on a respective inner or outer diameter of the skirt portion, the inner or outer threads configured to engage corresponding threads on the first end of the coupling,
wherein the skirt portion includes an opening to receive an identification tag, and
wherein when one of the two tubular members is engaged in the first engagement portion of the first end of the coupling, the skirt portion is spaced apart in a radial direction from the one of the two tubular members to define an annular space between the one of the two tubular members and the skirt portion, the annular space being open to an environment outside the coupling.

2. The system of claim 1, wherein the coupling is axially asymmetric such that the first end of the coupling is not structurally identical to the second end of the coupling.

3. The system of claim 1, wherein the second end of the coupling also includes a skirt portion.

4. The system of claim 1, further comprising:
the identification tag.

5. The system of claim 4, wherein the identification tag includes a radio-frequency identification tag.

6. The system of claim 4, wherein the identification tag includes:
an electronics module configured to wirelessly transmit information; and
a body to receive the electronics module.

7. The system of claim 6, wherein the electronics module is enclosed within the body.

8. The system of claim 6, wherein the body and the opening have cylindrical profiles.

9. The system of claim 6, wherein the opening extends to an axial end surface of said skirt portion such that the identification tag is installed in the opening by moving the identification tag parallel to a longitudinal axis of the coupling.

10. The system of claim 4, wherein the identification tag includes a carrier and a shell, the carrier including a cavity for receiving an electronics module.

11. The system of claim 10, wherein the electronics module is enclosed within the cavity with an encapsulant.

12. The system of claim 1, wherein said skirt portion has an axial length of at least ten millimeters.

13. The system of claim 1, wherein the opening is formed entirely through the skirt portion, the opening including a bore extending through an inner most portion of a wall of the skirt portion, the bore forming a stop engaging the identification tag when installed within the opening.

14. The system of claim 1, wherein at least one of the first and second engagement portions includes threads configured to engage its respective tubular member.

15. The system of claim 1, wherein the skirt portion is not configured to engage the two tubular members joined to the coupling.

16. A system comprising:
an Oil Country Tubular Good comprising a coupling configured to join two tubular members; and
an identification tag installed in an opening formed at a location at which the opening does not reduce a structural integrity of the coupling in a manner that would interfere with intended operation of the coupling, wherein the location is in a skirt portion, the skirt portion extending in an axial direction of the coupling beyond an engagement portion of an end of the coupling, the skirt portion including inner or outer threads on a respective inner or outer diameter of the skirt portion, the inner or outer threads configured to engage corresponding threads on the end of the coupling,
wherein when one of the two tubular members is engaged in the engagement portion of the end of the coupling, the skirt portion is spaced apart in a radial direction from the one of the two tubular members to define an annular space between the one of the two tubular members and the skirt portion, the annular space being open to an environment outside the coupling.

17. The system of claim 16, wherein the opening includes one or more deformations that mechanically retain the identification tag within the opening.

18. The system of claim 16, wherein the engagement portion includes threads configured to engage the one of the two tubular members.

19. A method comprising:
providing a coupling to join two tubular members, the coupling having a circumferentially outer surface,
providing a skirt portion that extends beyond an engagement portion with which one of the two tubular members is to engage with an end of the coupling; and
installing an identification tag in an opening in the skirt portion,
wherein the skirt portion includes inner or outer threads on a respective inner or outer diameter of the skirt portion, the inner or outer threads configured to engage corresponding threads on an the end of the coupling, and
wherein when the one of the two tubular members is engaged with the end of the coupling, the skirt portion is spaced apart in a radial direction from the one of the two tubular members to define an annular space between the one of the two tubular members and the skirt portion, the annular space being open to an environment outside the coupling.

20. The method of claim 19, wherein the engagement portion includes threads configured to engage the one of the two tubular members.

* * * * *